United States Patent
Matsunaga

(10) Patent No.: US 8,219,838 B2
(45) Date of Patent: Jul. 10, 2012

(54) IMAGE PROCESSING APPARATUS WITH POWER SAVING

(75) Inventor: Keiichi Matsunaga, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 596 days.

(21) Appl. No.: 12/399,012

(22) Filed: Mar. 5, 2009

(65) Prior Publication Data
US 2009/0235098 A1 Sep. 17, 2009

(30) Foreign Application Priority Data
Mar. 17, 2008 (JP) .................................. 2008-067723

(51) Int. Cl.
*G06F 1/32* (2006.01)
(52) U.S. Cl. ........................ 713/320; 713/324
(58) Field of Classification Search .......... 713/300–340; 345/501
See application file for complete search history.

(56) References Cited

U.S. PATENT DOCUMENTS

| | | | | |
|---|---|---|---|---|
| 5,901,067 A | * | 5/1999 | Kao et al. | 700/11 |
| 6,098,175 A | * | 8/2000 | Lee | 713/320 |
| 6,647,434 B1 | * | 11/2003 | Kamepalli | 710/14 |
| 6,782,482 B2 | * | 8/2004 | Nishizawa | 713/320 |
| 7,260,730 B2 | * | 8/2007 | Sakaue | 713/310 |
| 7,519,837 B2 | * | 4/2009 | Smith et al. | 713/300 |
| 7,966,507 B2 | * | 6/2011 | Kanzawa | 713/323 |
| 7,979,726 B2 | * | 7/2011 | Nakamura et al. | 713/323 |
| 2001/0022671 A1 | * | 9/2001 | Itoh | 358/448 |
| 2001/0039627 A1 | * | 11/2001 | Nishizawa | 713/320 |
| 2005/0120144 A1 | * | 6/2005 | Koyama | 710/8 |
| 2008/0028241 A1 | * | 1/2008 | Tamasaki | 713/310 |
| 2009/0044037 A1 | * | 2/2009 | Park et al. | 713/400 |
| 2009/0300380 A1 | * | 12/2009 | Vojak et al. | 713/310 |

FOREIGN PATENT DOCUMENTS

| | | |
|---|---|---|
| JP | H09-307672 A | 11/1997 |
| JP | 2001-148751 A | 5/2001 |
| JP | 2006-171297 A | 6/2006 |
| JP | 2006-330843 A | 12/2006 |

OTHER PUBLICATIONS

Japan Patent Office, Notification of Reason for Refusal for Japanese Patent Application No. 2008-067723, mailed May 25, 2010.

* cited by examiner

Primary Examiner — Raymond Phan
(74) Attorney, Agent, or Firm — Baker Botts L.L.P.

(57) ABSTRACT

An image processing apparatus includes a plurality of functions to perform image processing, an execution frequency calculation unit that calculates an execution frequency for each of the plurality of functions on the basis of an execution history of the image processing, a first selection unit that selects a function to which power is supplied in a power saving mode from the plurality of functions based on the execution frequency calculated by the execution frequency calculation unit, and a function setting unit that sets the function selected by the first selection unit as a function to which power is supplied in the power saving mode.

14 Claims, 14 Drawing Sheets

FIG. 6

| USE HISTORY | PREVIOUSLY BY ONE TIME | PREVIOUSLY BY TWO TIMES | PREVIOUSLY BY THREE TIMES | PREVIOUSLY BY FOUR TIMES | PREVIOUSLY BY FIVE TIMES |
|---|---|---|---|---|---|
| DATE OF OPERATION | 2009/1/30 | 2009/1/20 | 2009/1/20 | 2009/1/15 | 2009/1/10 |
| TYPE OF IMAGE PROCESSING | PRINTING RECEIVED FAX | PRINTING BY WIRED LAN | COPY | PRINTING BY WIRED LAN | DISPLAYING IMAGE DATA OF MEDIA CARD ON LIQUID CRYSTAL DISPLAY |
| OPERATING TIME (SECOND) | 20 | 30 | 10 | 350 | 200 |
| NUMBER OF SHEETS OF PAPER WHICH HAVE BEEN PRINTED | 1 | 2 | 1 | 30 | 0 |
| NUMBER OF SHEETS OF PAPER WHICH HAVE BEEN SCANNED | 0 | 0 | 1 | 0 | 0 |
| USE AMOUNT POINT | 2 | 3 | 2 | 10 | 1 |

FIG. 7

| | PRINTING RECEIVED FAX | PRINTING BY WIRED LAN | COPY | PRINTING BY WIRED LAN | DISPLAYING IMAGE DATA OF MEDIA CARD ON LIQUID CRYSTAL DISPLAY | TOTAL POINT |
|---|---|---|---|---|---|---|
| MEDIA CARD | | | | | 1 | 1 |
| WIRED LAN | | 3 | | 10 | | 13 |
| WIRELESS LAN | | | | | | 0 |
| SCANNING | | | 2 | | | 2 |
| PRINTING | | 3 | 2 | 10 | | 17 |
| FAX | 2 | | | | | 2 |
| CORDLESS PHONE | | | | | | 0 |

FIG. 14

| OPERATION MODE | POWER CONSUMPTION VALUE (W) ON STANDBY |
|---|---|
| MEDIA CARD | 1 |
| WIRED LAN | 1 |
| WIRELESS LAN | 2 |
| SCANNING | 2 |
| PRINTING | 1 |
| FAX | 1 |
| CORDLESS PHONE | 2 |

IMAGE PROCESSING APPARATUS WITH POWER SAVING

This application claims priority from Japanese Patent Application No. 2008-067723 filed on Mar. 17, 2008, the entire subject matter of which is incorporated herein by reference.

TECHNICAL FIELD

The invention relates to an image processing apparatus having a power saving mode, and more specifically, to an image processing apparatus having many functions performs selection of the power saving mode for each of the functions.

BACKGROUND

There has been proposed image processing apparatuses having many functions. In some of the image processing apparatuses, electricity is constantly supplied to equipment which includes individual functions to start operations in response to an execution request for each of the functions.

In recent years, restrictions on $CO_2$ emissions in view of environmental concerns have been strengthened, it has been demanded to decrease electric consumption of equipment. It has been demanded that a power saving mode be equipped for shutting off a power supply to equipment configuring functions for which no execution request has been made.

For example, JP-A-2001-148751 (paragraphs 0039, 0044, FIG. 5) discloses a related art image forming apparatus, in which a user can freely select a power saving mode for each of the components of the image forming apparatus. Selection is made by YES or NO for whether or not the power saving mode is selected in individual components for which the power saving mode is to be selected. In this case, when NO is selected, the component is subject to power saving mode in the initial setting, with the selection of power saving mode cancelled. The above-described processing is sequentially given to all the components.

SUMMARY

Aspects of the invention provide an image processing apparatus capable of selecting easily a power saving mode for each of the functions and optimizing the condition of electricity use flexibly and simply, depending on the condition of use.

BRIEF DESCRIPTION OF THE DRAWINGS

FIG. 6 is a drawing showing use amount points calculated from the execution history of image processing;

FIG. 7 is a chart for calculating execution frequency points for each of the functions from the execution history of image processing;

FIG. 14 is a view showing the power consumption of functions configuring the image processing in the power saving mode.

DETAILED DESCRIPTION

<General Overview>

Figure 1:
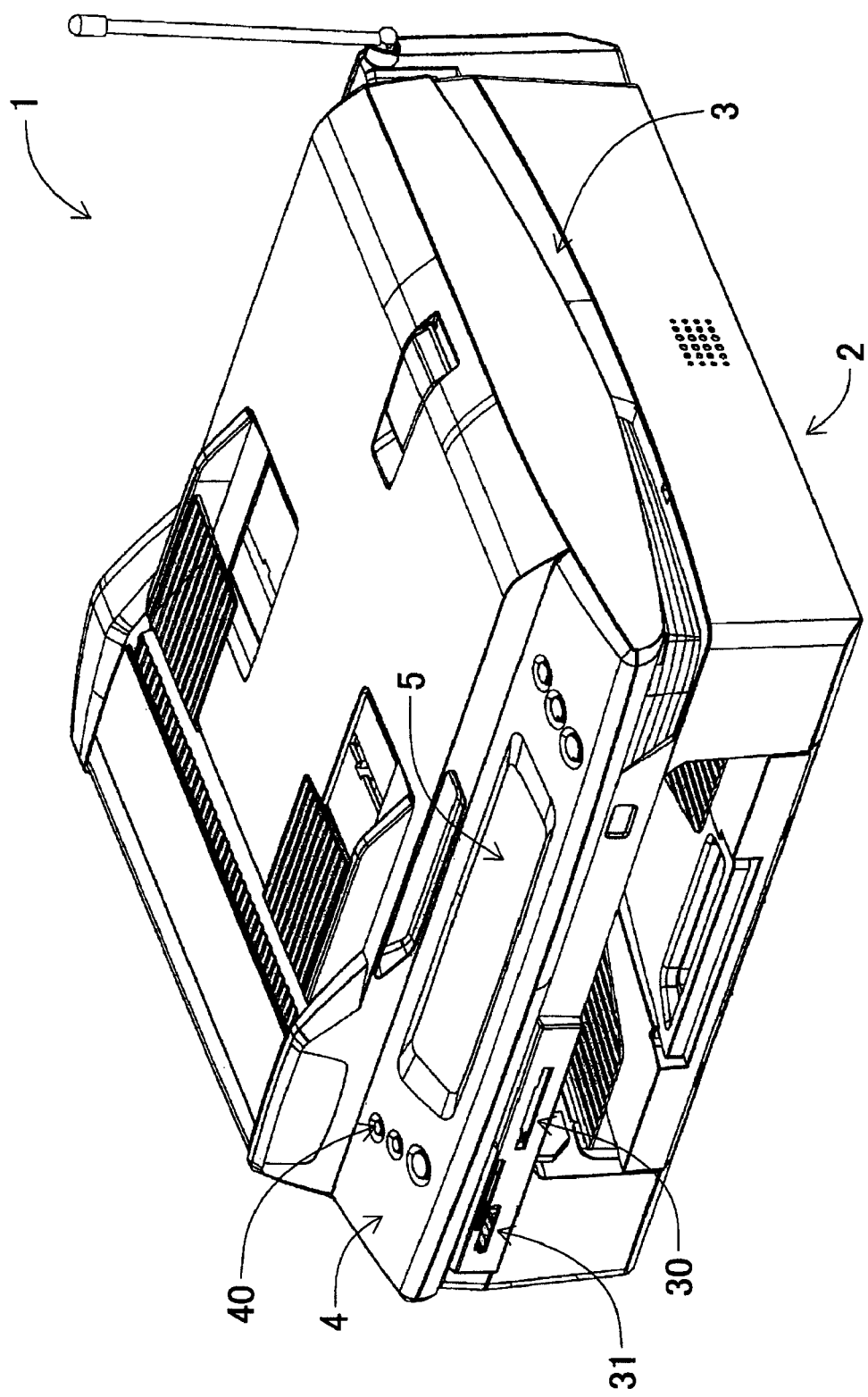
FIG. 1 is an image processing apparatus according to an exemplary embodiment of the invention.

The related art described above has some disadvantages. For example, in the related art image forming apparatus disclosed in JP-A-2001-148751, a user is required to make selection for whether or not a power saving mode is selected for each of a plurality of components. Thus, such a selection work becomes complicated and usability may be worse.

Specifically, in recent years where a range of functions of image processing apparatuses has increased, a combination of functions desired for use among many functions is expected to differ depending on users. Further, even by the same user, functions to be used are not fixed and may vary for each time depending on the operating time zone of an image processing apparatus, use duration, change in work content and others. With the above-described use environment taken into account, the related art image forming apparatus disclosed in JP-A-2001-148751 must be selected for a power saving mode for each of the functions to be used every time it is used. Thus, in the related art image forming apparatus, operations in selecting the functions may become complicated, and usability thereof may become worse.

Aspects of the invention provide an image processing apparatus capable of selecting easily a power saving mode for each of the functions and optimizing the condition of electricity use flexibly and simply, depending on the condition of use.

According to a first aspect of the invention, there is provided an image processing apparatus comprising: a plurality of functions to perform image processing; an execution frequency calculation unit that calculates an execution frequency for each of the plurality of functions on the basis of an execution history of the image processing; a first selection unit that selects a function to which power is supplied in a power saving mode from the plurality of functions based on the execution frequency calculated by the execution frequency calculation unit; and a function setting unit that sets the function selected by the first selection unit as a function to which power is supplied in the power saving mode.

According to a second aspect of the invention, in the image processing apparatus, wherein the execution frequency calculation unit expresses a load for each of the plurality of functions in accordance with an execution of the image processing in terms of numerical values and accumulates the numerical values of the load for the image processing that has already been performed multiple times.

According to a third aspect of the invention, in the image processing apparatus, wherein the execution frequency calculation unit accumulates the numerical values of the load for the image processing which has already been executed in a predetermined number of times.

According to a fourth aspect of the invention, in the image processing apparatus, wherein the execution frequency calculation unit expresses a load for each of the plurality of functions in terms of numerical values according to at least one of type, processing time and processing amount of the image processing.

According to a fifth aspect of the invention, the image processing apparatus further comprises: a second selection unit that selects the function to which power is supplied in the power saving mode according to an user's instruction, wherein, when the function to which power is supplied in the power saving mode is not selected by the second selected unit, the function setting unit sets the function to which power is supplied in the power saving mode as the function selected by the first selection unit, and wherein, when the function to which power is supplied in the power saving mode is selected by the second selection unit, the function setting unit sets the function to which power is supplied in the power saving mode as the function selected by the second selection unit.

According to a sixth aspect of the invention, in the image processing apparatus, wherein the second selection unit comprises: an initial setting unit that sets a function set by the function setting unit as an initial setting function; a power selection unit that selects a power consumption in the power saving mode according to the user's instruction; and a priority selection unit that selects or non-selects the function to which power is supplied in the power saving mode with priority based on the execution frequency calculated by the execution frequency calculation unit in accordance with a power difference between the power consumption selected by the power selection unit and the power consumption supplied to the initial setting function, wherein the priority selection unit selects the function to which power is supplied in the power saving mode with priority given to a function having high execution frequency, and where in the priority selection unit non-selects the function to which power is supplied in the power saving mode with priority given to a function having low execution frequency.

According to a seventh aspect of the invention, in the image processing apparatus, wherein the priority selection unit selects the function to which power is supplied in the power saving mode with priority given to the function having high execution frequency when the power consumption selected by the power selection unit is greater than the power consumption due to power supply to the initial setting function, and wherein the priority selection unit non-selects the function to which power is supplied in the power saving mode with priority given to function having low execution frequency when the power consumption selected by the power selection unit is smaller than the power consumption due to the power supply to the initial setting function.

According to an eighth aspect of the invention, in the image processing apparatus, wherein, when the priority selection unit is continuously executed after the priority selection unit selects or non-selects the function to which power is supplied in the power saving mode, the priority selection unit selects the function to which power is supplied in the power saving mode with priority given to the function having high execution frequency among the functions that are not selected, when the power consumption selected by the power selection unit is greater than the power consumption of the function selected by previous execution of the priority selection unit, and the priority selection unit non-selects the function to which power is supplied in the power saving mode with priority given to the function having low execution frequency among the already selected functions, when the power consumption selected by the power selection unit is smaller than the power consumption of the function selected by the previous execution of the priority selection unit.

According to a ninth aspect of the invention, in the image processing apparatus, wherein the second selection unit comprises an individual selection unit that selects or non-selects individually for each of the plurality of functions.

According to a tenth aspect of the invention, the image processing apparatus further comprises: an input display unit that receives an input of the user's instruction and displays a selected condition of each of the plurality of functions.

According to an eleventh aspect of the invention, in the image processing apparatus, wherein the input display unit comprises a touch panel.

According to a twelfth aspect of the invention, there is provided a computer-readable medium having a computer program stored thereon and readable by an image processing apparatus comprising a plurality of functions to perform image processing, the computer program, when executed by the image processing apparatus, causes the image processing apparatus to perform operations comprising: calculating an execution frequency for each of the plurality of functions on the basis of an execution history of the image processing; selecting a function to which power is supplied in a power saving mode from the plurality of functions based on the calculated execution frequency; and setting the selected function as a function to which power is supplied in the power saving mode.

The image forming apparatus according to the aspects of the invention includes a plurality of functions and performs image processing by combination of these functions. The execution frequency calculation unit is used to calculate the execution frequency for each of the functions on the basis of execution history of the image processing. On the basis of the execution frequency calculated by the execution frequency calculation unit, the first selection unit selects functions to which power is supplied in the power saving mode. The function setting unit sets functions selected by the first selection unit as a function to which power is supplied in the power saving mode.

Thereby, the execution frequency for each of the functions configuring the image processing is calculated on the basis of the execution history of image processing. Thus, it is possible to select functions to which power is supplied in the power saving mode on the basis of the execution frequency. Then, the selected functions can be set as a function to which power is supplied in the power saving mode.

A user is not required to select functions to which power should be supplied in the power saving mode. No troublesome operations are needed in selecting the functions to which power should be supplied in the power saving mode. Thus, usability can be enhanced.

Further, the functions to which power should be supplied in the power saving mode are selected depending on the execution frequency for each of the functions in image processing. Thus, it is possible to supply power in the power saving mode to a function in accordance with the condition of use of an image processing apparatus. It is also possible to execute quickly and smoothly a function high in the execution frequency from power saving mode. Therefore, the condition of electricity use can be optimized flexibly and simply, depending on the condition of use, without impairing the convenience of the image processing apparatus.

With the execution of image processing, the image processing apparatus according to the second aspect of the invention expresses in terms of numerical values a load for each of the functions configuring the image processing. For the load expressed in terms of numerical values, the numerical values of loads for image processing which have already been executed multiple times are accumulated.

The executed image processing is expressed for loads in terms of numerical values, and numerical values of the loads on execution of multiple times are accumulated. The execution frequency for each of the functions in accordance with execution of multiple times is expressed in terms of numerical values and calculated. Therefore, it is possible to select simply and easily functions to which power should be supplied in the power saving mode by comparing the numerical values.

In the image processing apparatus according to the third aspect of the invention, a load of each of the functions with the execution of image processing is expressed in terms of numerical values and accumulated for image processing which have already been executed multiple times.

Therefore, it is possible to grasp the execution frequency in terms of numerical values with respect to a predetermined number of times of execution history. By making selection for a predetermined number of times, this enables adjustment of a length of the execution history for which the execution frequency is to be grasped.

In the image processing apparatus according to the fourth aspect of the invention, a load of each of the functions is expressed in terms of numerical values depending on at least any one selected from the type, processing time, and processing amount of image processing. Functions to be used differ depending on the type, processing time, and the processing amount of image processing also differs. Therefore, it is possible to express in terms of numerical values a load of each of the functions composing image processing accurately based on these indexes.

In the image processing apparatus according to the fifth aspect of the invention, the second selection unit is used to select functions to which power is supplied in the power saving mode according to the user's instructions. When no selection is made by the second selection unit, the function setting unit sets the functions selected by the first selection unit as a function to which power is supplied in the power saving mode. Further, when selection is made by the second selection unit, the function setting unit sets a function selected by the second selection unit as a function to which power is supplied in the power saving mode.

According thereto, it is possible to give priority to setting of functions to which power is supplied in the power saving mode selected according to the user's instructions. Further, when no instructions are given from the user, it is possible to set the functions to which power is supplied in the power saving mode selected on the basis of the execution frequency of each of the functions introduced by the execution history of image processing. When no selections are given by the user, with priority given to the selection by the user, functions are set on the basis of the execution frequency. Thereby, it is possible to select the power saving mode which is convenient for users.

In the image processing apparatus according to the sixth aspect of the invention, initial setting unit is used to set a function selected by the first selection unit and set by the function setting unit as an initial setting function. The power selection unit selects a power consumption in the power saving mode according to the user's instructions. The priority selection unit is used to make selection, with priority given to functions higher in the execution frequency calculated by the execution frequency calculation unit according to a power difference between the power consumption selected by the power selection unit and the power consumption supplied to the initial setting function. The priority selection unit is used to make non-selection, with priority given to functions lower in the execution frequency.

According thereto, the function set by the function setting unit is given as an initial setting function. Thus, when instructions are given from a user, priority is given to the user's instructions, and when no instructions are given from the user, a function set by the function setting unit is selected. In this case, the user's instructions are also set as a function in the power saving mode by the function setting unit. Therefore, a function selected according to the execution frequency is reliably reflected, if no functions are provided by the previous user's instructions or no user's instructions are given.

Further, on the basis of the power consumption selected by the power selection unit according to the user's instructions, the priority selection unit automatically selects functions to which power is supplied according to the execution frequency. Therefore, it is possible to optimize the condition of electricity use flexibly and easily, depending on the condition of use, within a range of the power consumption desired by a user.

In the image forming apparatus according to the seventh aspect of the invention, additional selection or additional non-selection is given to functions selected as an initial setting function, by which a total sum of the power consumption resulting from the functions to which power is supplied in the power saving mode is allowed to be coincident with the power consumption selected by the power selection unit according to the user's instructions. In this case, an additional selecting function is used to make selection with priority given to functions higher in the execution frequency, while an additional non-selecting function is used to make non-selection with priority given to functions lower in the execution frequency.

According thereto, the functions selected as an initial setting function are set as an initial setting condition, and functions selected by the user's instructions are selected as a function to which power is supplied in the power saving mode on the basis of the execution frequency of each of the functions. In this case, the initial setting function is selected by the user's instructions or by the execution frequency, with a priority given to the user's instructions. The functions to which power is supplied in the power saving mode can be selected, with priority given to the user's instructions, and in accordance with the execution frequency of each load. It is possible to select functions in compliance with the user's intention and condition of use.

In the image processing apparatus according to the eighth aspect of the invention, in a case where additional processing is continuously performed after the priority selection unit is used to make selection with priority given to functions higher in execution frequency, or the priority selection unit is used to make non-selection with priority given to functions lower in execution frequency, when the power consumption selected by the power selection unit is greater than the power consumption of functions which have already been selected by the processing, the priority selection unit is used to make selection with priority given to functions higher in the execution frequency among those functions which have not been selected. Further, if the power consumption selected by the power selection unit is smaller than the power consumption of functions which have already been selected by the processing, the priority selection unit is used to make non-selection with priority given to functions lower in the execution frequency among the already selected functions.

According thereto, when the priority selection unit is used to make selection or non-selection of functions and additional processing is thereafter performed, a new function may be added to already selected functions by additional selection or by additional non-selection. It is not necessary to make selection again from the beginning by resetting already selected functions for every change in selection of power consumption. Information which has already been selected can be effectively used.

In the image processing apparatus according to the ninth aspect of the invention, a user can use individual selection unit to make selection or non-selection individually for each of the functions.

In the image processing apparatus according to the tenth aspect of the invention, the input display unit is preferably used to display the input of the user's instructions and the selected condition of the function.

Further, in the image processing apparatus according to the eleventh aspect of the invention, the input display unit is preferably a touch panel.

Still further, according to the twelfth aspect of the invention, the computer-readable medium for causing the image processing apparatus to perform operations is provided.

EXEMPLARY EMBODIMENTS

Exemplary embodiments of the invention will now be described with reference to the drawings.

FIG. 1 shows an image processing apparatus 1 according to an exemplary embodiment of the invention. In FIG. 1, the image processing apparatus 1 includes a printer part 2 such as an inkjet printer and a flatbed-type scanner part 3 at the lower part and the upper part of a frame. Further, the image processing apparatus 1 includes an operation panel part 4 at the front upper face of the frame. A touch panel-equipped liquid crystal display screen 5 is disposed at the center of the operation panel part 4. In this case, the touch panel-equipped liquid crystal display screen 5 is a liquid crystal display formed in a rectangular shape longer in a transverse direction so as to have a wide-size display part.

Figure 2:
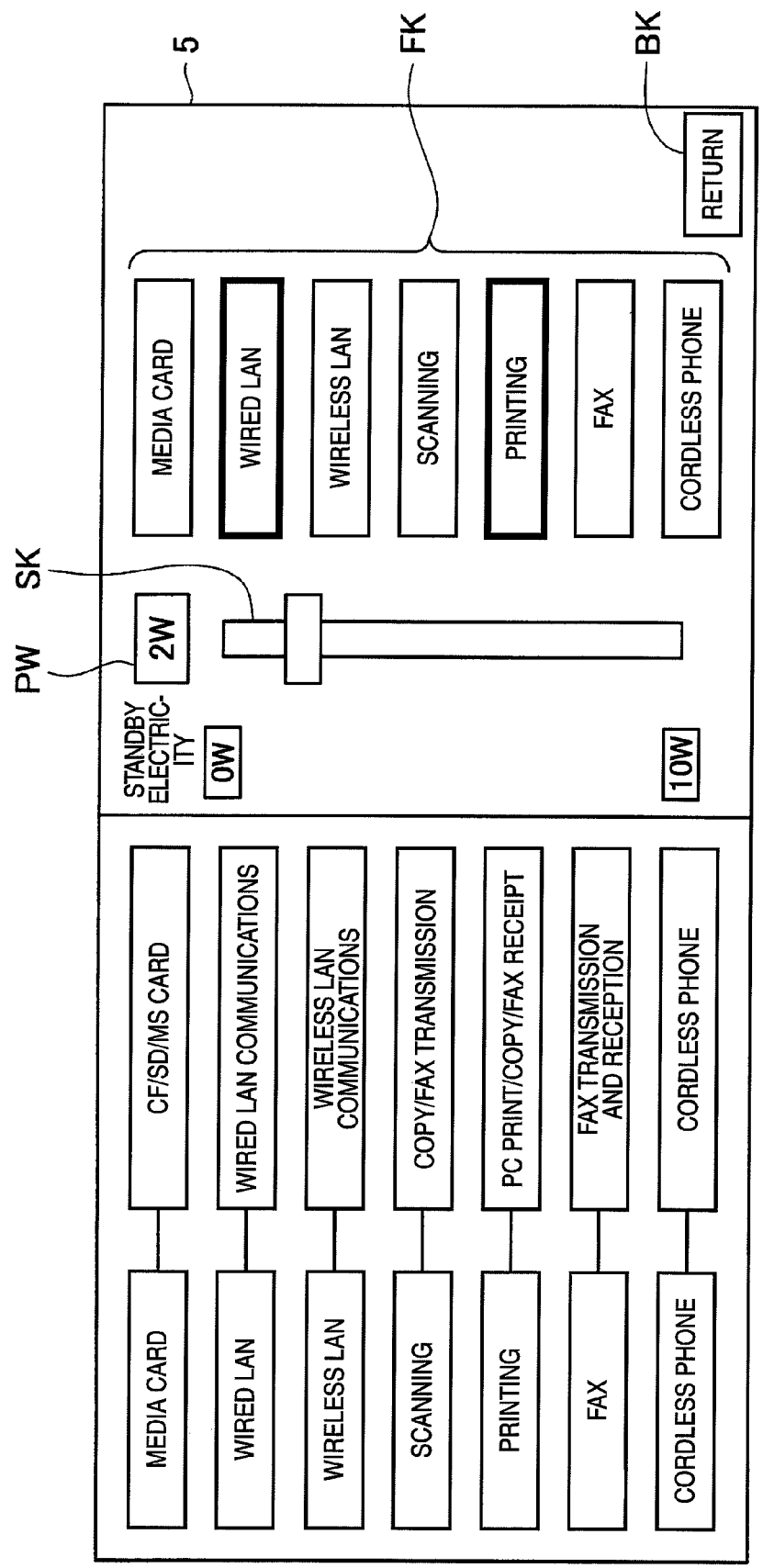
FIG. 2 is an example of a display screen in a power consumption selection mode.

The touch panel-equipped liquid crystal display screen 5 displays key input, various types of information, and so on. FIG. 2 shows a display screen in the power consumption selecting mode (which will be described later). A list of functions to be executed in various types of image processing that the image processing apparatus 1 has is displayed on a left half side of the touch panel-equipped liquid crystal display screen 5. An input screen on which functions to which power is supplied in the power saving mode are selected and the selected conditions (which will be described later) are displayed on a right half side of the touch panel-equipped liquid crystal display screen 5.

The functions displayed on the left half side include media cards, wired LAN, wireless LAN, scanning, printing, FAX and cordless phone. In addition, various types of image processing such as CF/SD/MS cards, wired LAN communications, wireless LAN communications, copy/FAX transmission and reception, PC print, and cordless phone which are executed by a combination of these functions may also be displayed. Further, a scroll key SK and a toggle key FK for each of the functions are displayed as input unit on the input and display screen on the right half side. The scroll key SK is to select continuously the power consumption in the power saving mode according to the user's instructions. The selected power consumption is displayed on a power consumption display window PW. The toggle key FK for each of the functions is a key for switching a selection/non-selected condition every time the key is depressed by the user. The display form is made different depending on the selected condition or the non-selected condition. FIG. 2 shows a condition that the wired LAN and the printing are selected. Further, a return key BK is provided at the right lower end. The return key is a key for returning a display content from a display screen in the power consumption selection mode now on the display to a display screen which is higher by one stage.

When functions to which power is supplied in the power saving mode are selected on the above-described display screen in the power consumption selection mode, power is supplied in the power saving mode only to the selected function. Incidentally, the power saving mode is a mode which restricts functions to which power is supplied while an image processing apparatus 1 is on standby and no image processing is performed. Therefore, when a request is made for image processing configured by functions to which power is supplied in the power saving mode, the image processing apparatus 1 is able to smoothly return from a standby condition and execute the required image processing. Alternatively, a request is made for image processing configured by functions to which power supply is shut off in the power saving mode, the image processing apparatus 1 returns from the standby condition after power is supplied to the functions then executes the required image processing.

For example, as shown in FIG. 2, in a case where a wired LAN and printing are selected as a function to which power is supplied in the power saving mode, power has already been supplied to a wired LAN function and a printing function which configure the image processing. Therefore, if a request is made for PC print (processing at which print data transmitted from PC via wired LAN is printed) as image processing, the image processing apparatus 1 is able to return smoothly from a standby condition and start processing. However, when a request is made for copy (processing of scanning and printing documents) as image processing, no power is supplied to the scan function which configures this image processing. Thus, copy processing is started after power is supplied to the scan function.

Other input keys 40 shown in FIG. 1 include, for example, a power supply key for instructing application of a power supply to the image processing apparatus 1. It is possible to give various types of instructions to the image processing apparatus 1 according to operations of the individual input keys 40.

The image processing apparatus 1 includes slot parts 30 and 31 capable of receiving data between detachable storage media. Various types of media cards can be inserted to the slot parts 30 and 31. For example, compact flash (registered trademark), SD memory card (registered trademark), memory stick (registered trademark) and others can be used in a removable manner. The slot parts 30 and 31 are provided below an operation panel part 4. Preferably, the slot parts 30 and 31 are provided just below the operation panel part 4. The slot parts 30 and 31 may be configured such that the compact flash (registered trademark) and the SD memory card (registered trademark) are fitted in the slot part 30, and the memory stick (registered trademark) is fitted in the slot part 31.

Figure 3:
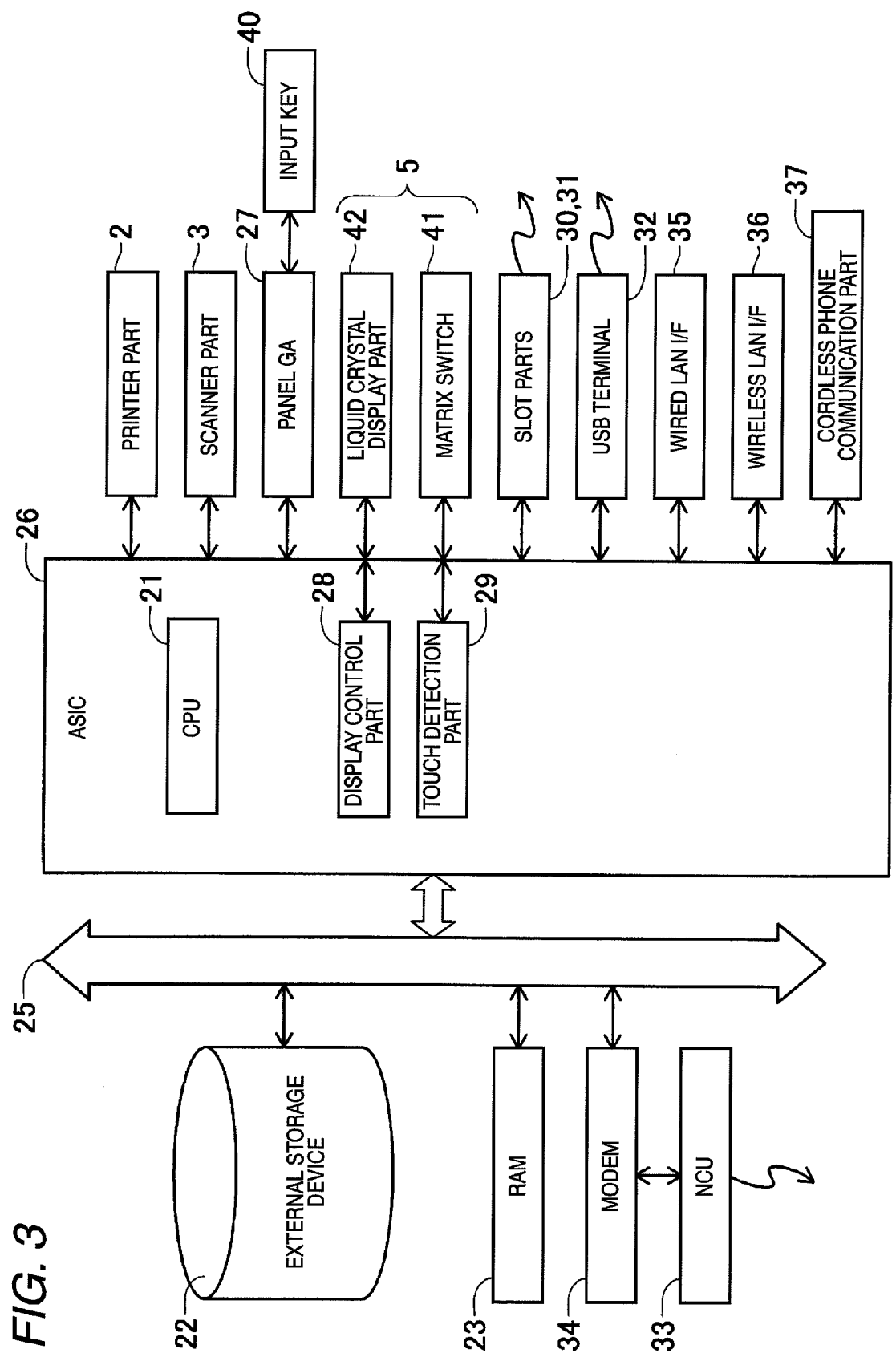
FIG. 3 is a circuit block diagram of the image processing apparatus.

With reference to FIG. 3, a system configuration of the image processing apparatus 1 will be described. FIG. 3 is a circuit block diagram of the image processing apparatus. In other words, FIG. 3 is a block diagram showing a system configuration of the image processing apparatus 1. An application specific integrated circuit (ASIC) 26 is to provide integrated control processing in order to execute various functions of the image processing apparatus 1 according to instructions of a CPU 21. The ASIC 26 is connected to an external storage device 22, a RAM 23 and a MODEM 34 via an external bus 25.

The ASIC 26 is also connected to a printer part 2, a scanner part 3, slot parts 30, 31, a USB terminal 32, a wired LAN I/F 35 for wired LAN communications, a wireless LAN I/F 36 for wireless LAN communications, and a cordless phone communication part 37 for communications with a cordless phone functioning as a cordless handset. The input key 40 is connected to the ASIC 26 via a panel gate array (panel GA) 27. The panel gate array (panel GA) 27 operates various input keys 40 to control operations of inputting key signals into the ASIC 26.

The touch panel-equipped liquid crystal display screen 5 includes a matrix switch 41 made of a transparent electrode and a liquid crystal display part 42 disposed below the switch 41. The matrix switch 41 is connected to a touch detection part 29 inside the ASIC 26, and the liquid crystal display part 42 is connected to a display control part 28 inside the ASIC 26. When a user touches a desired position on the matrix switch 41, the touch detection part 29 detects the touched coordinate position and outputs a position signal to the CPU 21.

The display control part 28 controls the screen display of the liquid crystal display part 42 in order to allow the liquid crystal display part 42 to display various types of information on functions executed by the image processing apparatus 1 in accordance with instructions from the CPU 21.

A network control part (NCU) 33 is connected to the MODEM 34 for controlling facsimile communications. The MODEM 34 is connected to the ASIC 26 via the external bus 25.

Various types of execution programs and data executed by the CPU 21 are accommodated in the external storage device 22. Specifically, as execution programs, an execution program for image processing (FIG. 4), an automatic selection program for functions to which power is supplied from the execution history of image processing (FIG. 5), a program for processing power consumption selection mode and shifting to the power saving mode (FIG. 8), programs for the power consumption selection mode (FIG. 9 and FIG. 10) and others are accommodated in the external storage device 22. As data, data on user selection of functions to which power is supplied in the power saving mode (D1), point data of execution frequency for each of the functions and data on functions to which power is supplied in the power saving mode determined by execution frequency (D2), function data on functions to which power is supplied in the power saving mode (D3) and others are accommodated in the external storage device 22.

As will be described later in FIG. 4, the execution program for image processing is a main program for executing image processing. As will be described later in FIG. 5, the automatic selection program for functions to which power is supplied from the execution history of image processing obtains the history of each of the functions in image processing executed by the execution program for image processing and determines the order of priority of functions to which power is supplied in the power saving mode. As will be described later with reference to FIG. 8, the programs for the processing power consumption selection mode and shifting to the power saving mode determines whether or not to shift to the power consumption selection mode and the power saving mode. As will be described later in FIG. 9 and FIG. 10, the program for power consumption selection mode selects functions to which power is supplied in the power saving mode on the basis of selection by a user and that according to execution frequency.

Figure 5:
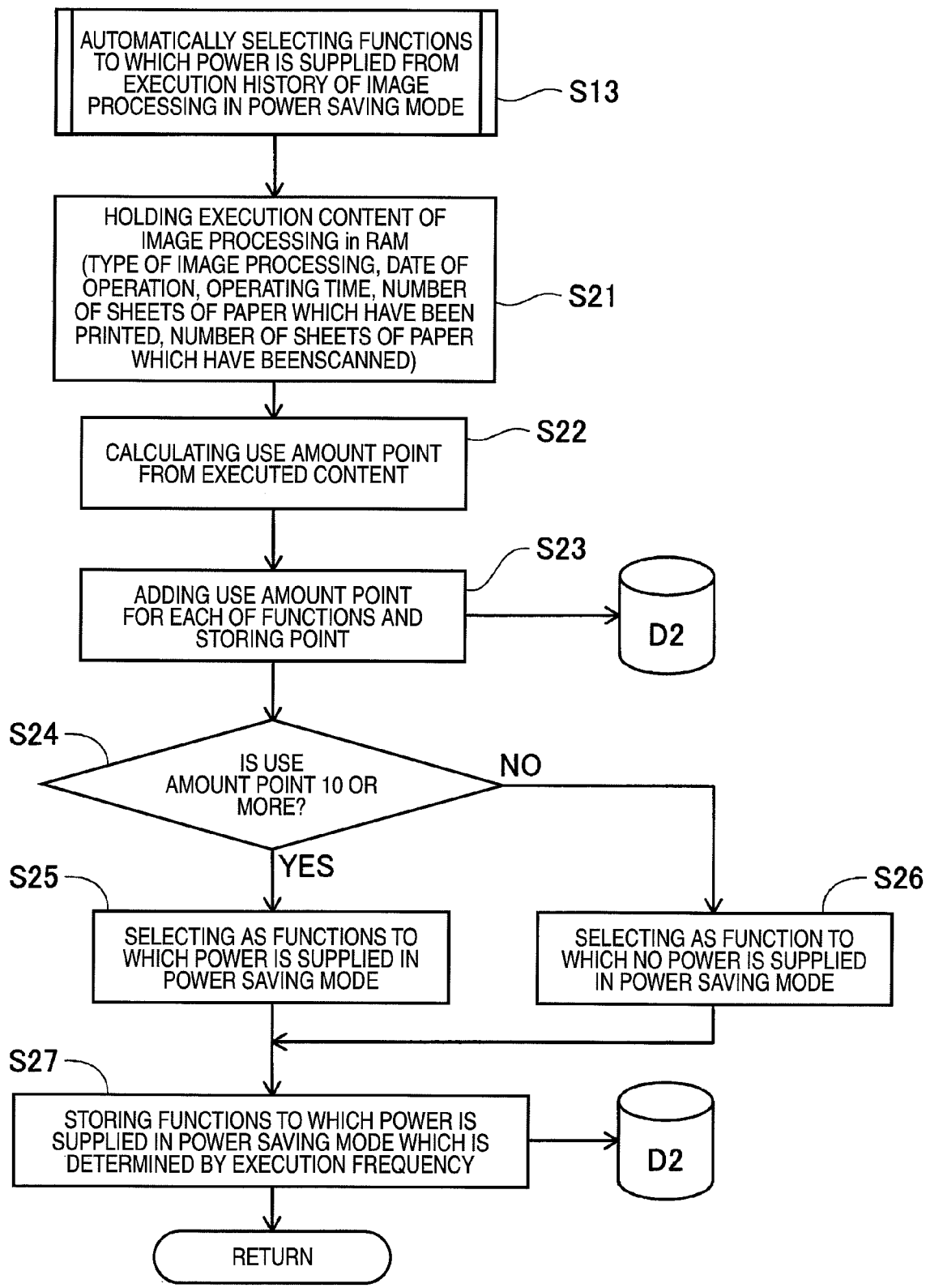
FIG. 5 is a flowchart showing an automatic selection program of supplying power from an execution history of the image processing.
Figure 8:
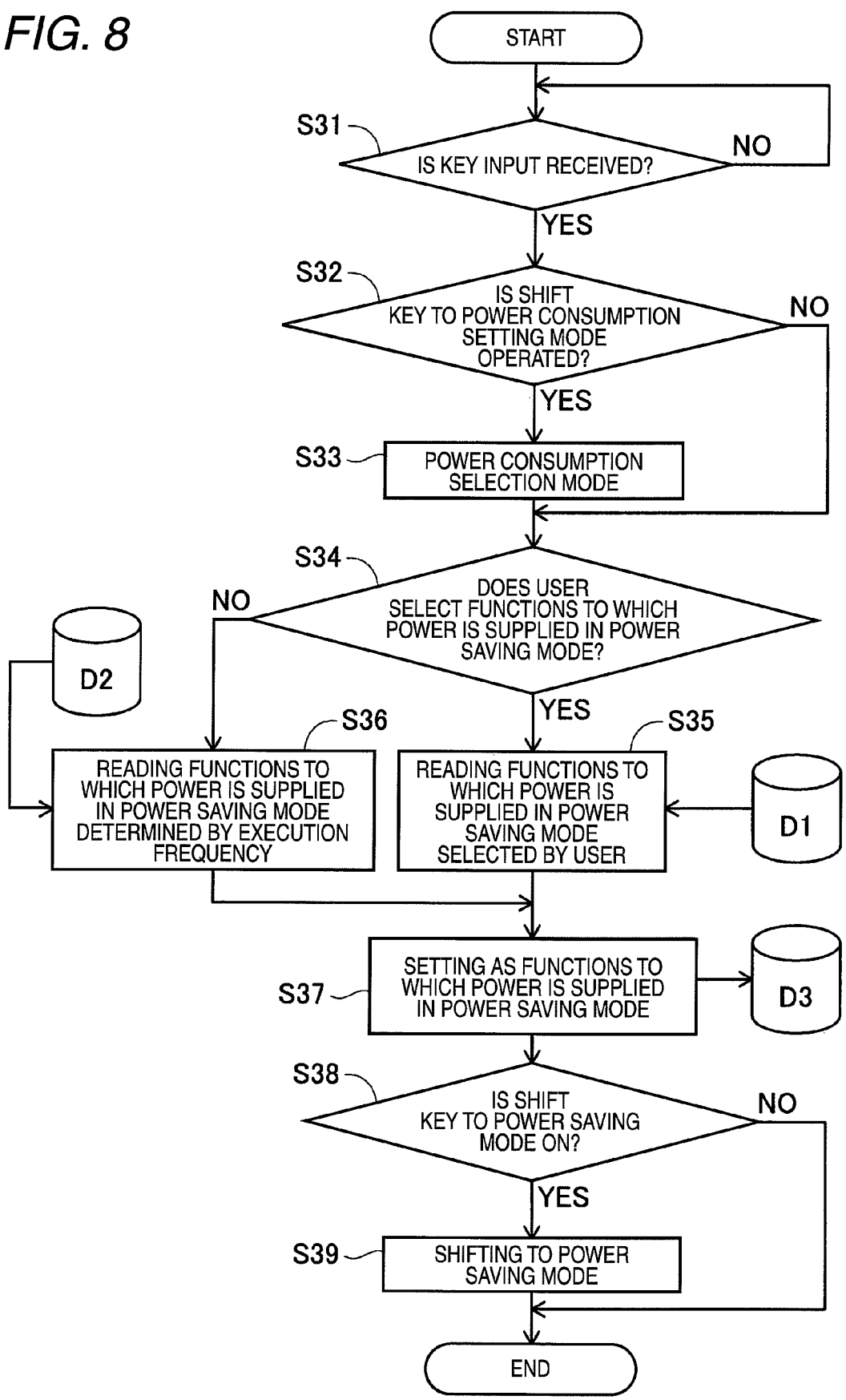
FIG. 8 is a flowchart showing processing in the power consumption selection mode and a shifting program to power saving mode.
Figure 9:
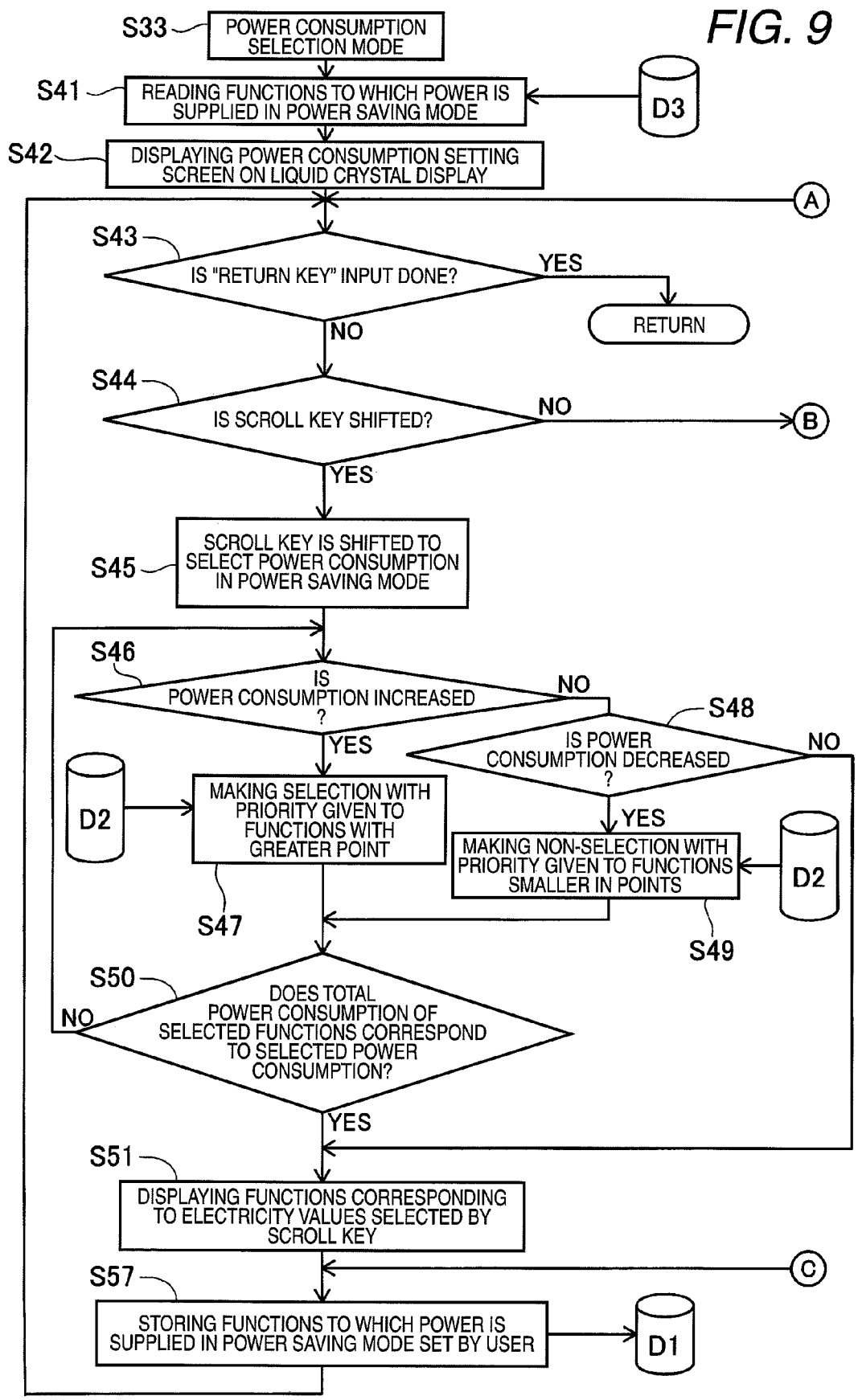
FIG. 9 is a flowchart showing a program for power consumption selection mode.
Figure 10:
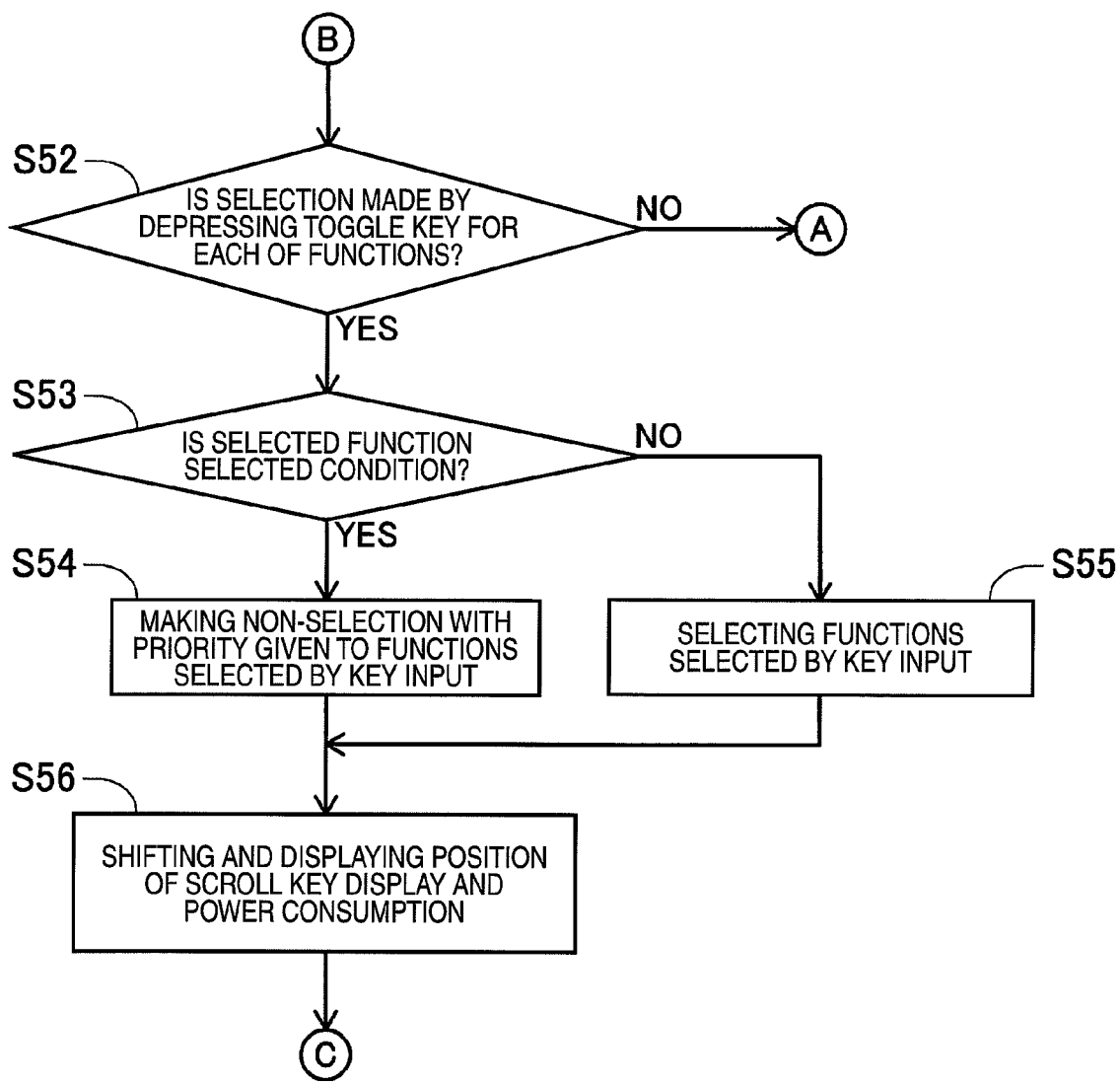
FIG. 10 is a flowchart showing the program for power consumption selection mode continued from FIG. 9.

Further, the data on user selection of functions to which power is supplied in the power saving mode (D1) is selected in the program for the power consumption selection mode (FIG. 9 and FIG. 10). The point data on execution frequency for each of the functions and the data on functions to which power is supplied in the power saving mode determined by the execution frequency (D2) are calculated in the automatic selection program for functions to which power is supplied from the execution history of image processing (FIG. 5). The function data on functions to which power is supplied in the power saving mode (D3) is selected in the program for processing in the power consumption selection mode and shifting to the power saving mode (FIG. 8).

The RAM 23 is a working field at which various programs and arithmetic result data are temporarily stored when the CPU 21 executes various programs accommodated in the external storage device 22.

Hereinafter, a description will be given sequentially for operations of the image processing apparatus 1 in accordance with individual programs.

Figure 4:
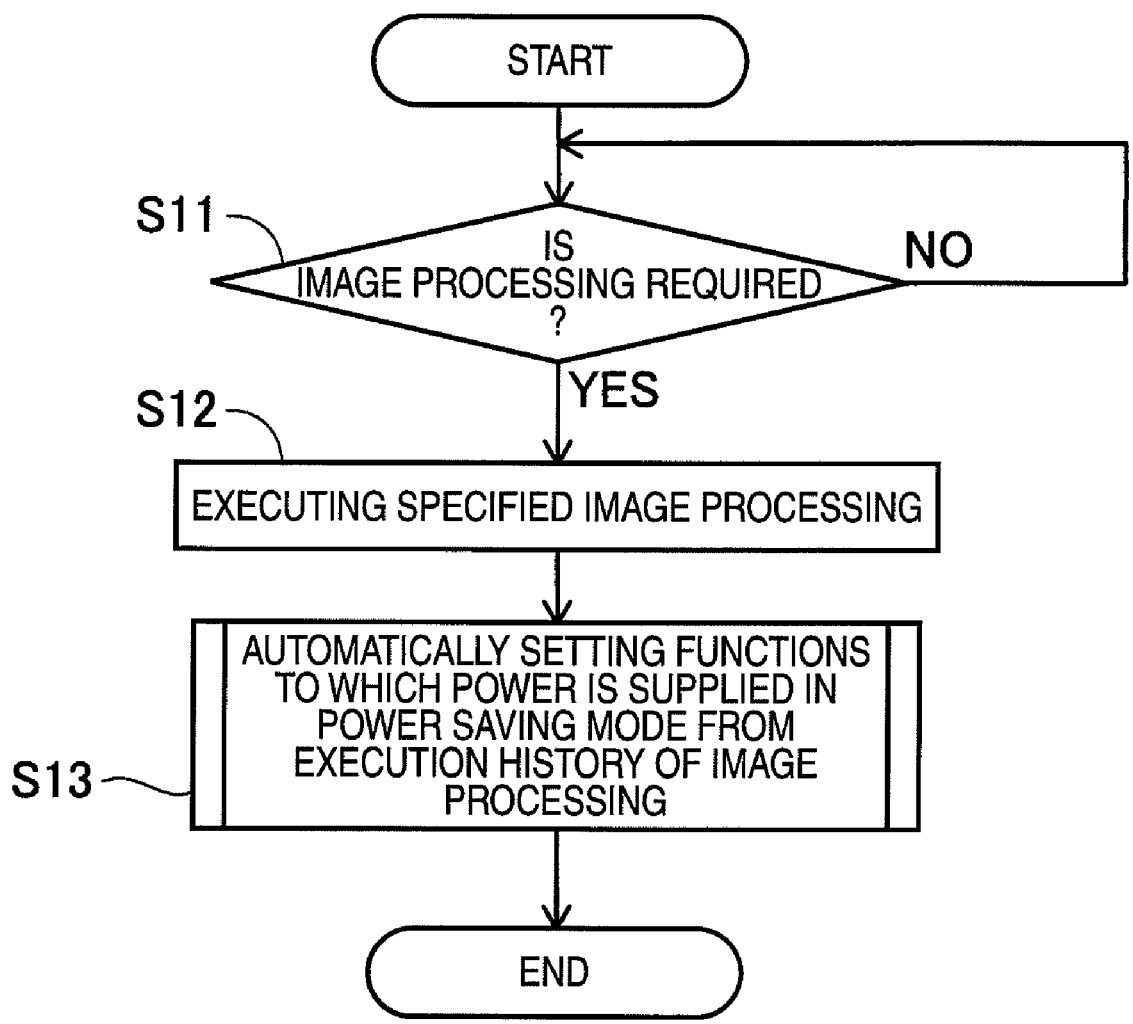
FIG. 4 is a flowchart showing an execution program of image processing executed by the image processing apparatus.

FIG. 4 shows an execution program for image processing. A program accommodated in the external storage device 22 is loaded into the RAM 23 when the image processing apparatus 1 is turned on, and the execution is started. The program is started, by which the condition is shifted to a standby condition of image processing request (S11). When no image processing request is detected (S11: NO), the processing of S11 is repeated. In contrast, when the image processing request is detected (S11: YES), the required image processing is executed (S12). In this case, the image processing is, for example, processing such as "printing received FAX," "printing by wired LAN," "copy," and "liquid crystal display of image data of media cards" (refer to FIG. 6 and FIG. 7). These types of image processing are executed by using the printer part 2, scanner part 3, liquid crystal display part 42, slot parts 30, 31, NCU 33, MODEM 34, wired LAN I/F 35, wireless LAN I/F 36 and cordless phone communication part 37 as shown in FIG. 3. Every time the image processing is executed, processing is performed to automatically select a function to which power is supplied in the power saving mode from the execution history of image processing (S13).

Processing that selection is made automatically for a function to which power is supplied in power saving mode from the execution history of image processing (S13) is executed by the program shown in FIG. 5.

Upon starting the processing, the content executed by the image processing is temporarily held in the RAM 23 (FIG. 3) (S21). Various types of information are held such as types of image processing, date of operation, operating time, number of sheets of paper which have been printed and number of sheets of paper which have been scanned (see FIG. 6, for example). FIG. 6 shows the history of image processing performed five times in the past.

The types of image processing include "printing received FAX" in one-time previous processing, "printing by wired LAN" in two-time previous processing, "copy" in three-time previous processing, "printing by wired LAN" in four-time previous processing, and "liquid crystal display of image data of media cards" in five-time previous processing, which are temporarily held. Further, the date of operation and the operating time are held for individual types of processing. Still further, the number of sheets of paper which have been printed and number of sheets of paper which have been scanned for each processing are held. In this case, since no scanning processing is performed in the "printing received FAX" or the "printing by wired LAN," the number of sheets of paper which have been scanned is held as zero.

Then, calculation is made for a use amount point of each image processing with reference to the content executed by the image processing held in the RAM 23 (FIG. 3) (S22). The calculated use amount point is added as a point indicating the execution frequency of functions configuring the image processing to a point which has already been calculated for each of the functions. The added point is stored as point data (D2) on the execution frequency of each of the functions in the external storage device 22 (FIG. 3) (S23).

In this case, the use amount point is obtained by weighting and expressing in terms of numerical value the content executed for each image processing in accordance with loads such as the type of image processing, operating period of time, number of sheets of paper which have been printed and number of sheets of paper which have been scanned when image processing is executed, which is a numerical value that correlates with power consumption when image processing is executed. Although to the same image processing, the longer the operating period of time and the larger the number of sheets of paper which have been printed and scanned, a greater use amount point is imparted. FIG. 6 illustrates use amount points calculated for each image processing. Two points are calculated for "printing received FAX," which is one-time previous processing; three points, for "printing by wired LAN," which is two-time previous processing; two points, for "copy," which is three-time previous processing; ten points for "printing by wired LAN," which is four-time previous processing; and one point for "liquid crystal display of image data of media cards," which is five-time previous processing.

Further, the "function" is a unit of fundamental processing which is necessary for executing image processing. As illustrated in FIG. 7, the "printing received FAX" is configured with "printing" and "FAX communications"; the "printing by wired LAN," "wired LAN" and "printing"; the "copy," "scanning" and "printing"; the "liquid crystal display of image data of media cards," "media card". Therefore, each of the image processing is configured with a singular unit function or plural unit functions. Use amount points calculated for each image processing calculated in Step (S22) are allocated to each of the functions configuring the image processing and added to a point already allocated as an execution frequency point of each of the functions and accumulated accordingly. Total points shown in FIG. 7 are accumulated points of the execution frequency for each of the functions.

A point added and accumulated for each of the functions in Step (S23) is determined to be higher in the execution frequency as the value thereof is greater. Therefore, in Step (S24), the point value is determined for magnitude. With ten points given as a criteria value, a function in which the added and accumulated point is 10 or more (S24: YES) is selected as a function to which power is supplied in the power saving mode (S25). A function in which the point is less than 10 (S24: NO) is selected as a function to which no power is supplied in the power saving mode (S26). A condition selected for each of the functions in Step (S25) and Step (S26) is accommodated in the external storage device 22 as data (D2) on functions to which power is supplied in the power saving mode determined by execution frequency together with point on the execution frequency of each of the functions (S27).

FIG. 8 shows a program for processing in the power consumption selection mode and shifting to power saving mode. This is a program for shifting to power saving mode after the processing in the power consumption selection mode which selects functions to which power is supplied in the power saving mode. The program of FIG. 8 is a program which is executed together with the execution program of image processing (FIG. 4). More specifically, the program of FIG. 8 is started for execution, by which a shift key to the power consumption selection mode or power saving mode is in a key input standby condition (S31). In the meantime, the program of FIG. 4 is started for execution, by which an image processing request is in a standby condition (S11).

When the program is started, the above condition is changed to a standby condition for key input (S31). When no key input is detected (S31: NO), the processing in S31 is repeated. In contrast, when the key input is detected (S31: YES), a determination is made for whether or not a shift key to power consumption selection mode is operated (S32). When it is determined that the shift key to the power consumption selection mode is operated (S32: YES), the step is changed to processing in the power consumption selection mode (S33). When the key operation indicates that the power consumption selection mode is skipped (S32: NO), the processing in the power consumption selection mode is skipped (S33).

When the programs for the power consumption selection mode shown in FIG. 9 and FIG. 10 are started after shifting to power consumption selection mode, function data (D3) on functions to which power is supplied in the power saving mode, which is accommodated in the external storage device 22 in the program of FIG. 8 (S41) is read. Then, a power consumption selection screen is displayed on a liquid crystal display part 42 (S42). This is, for example, the screen shown in FIG. 2.

In this case, the function data (D3) on functions to which power is supplied in the power saving mode is data which has already been selected by the previous processing. Processing of accommodating the function data (D3) in the external storage device 22 will be described later. The processing in Step (S41) is used to set an initial value in the power consumption selection mode. In the power consumption selection mode, the function data (D3) on functions to which power is supplied in the power saving mode, which has already been selected, is used as the initial value, selection or non-selection for functions to which power is supplied in the power saving mode is made according to the user's instructions to be described later.

Depression of a return key BK is monitored (S43), and when the depression is detected (S43: YES), the power consumption selection mode is terminated and changed to Step (S34). When no depression is detected (S43: NO), the condition is in a standby condition for key input. A determination is first made for whether or not the movement of a scroll key SK is detected (S44). When the movement of the scroll key SK is detected (S44: YES), the step is changed to selection processing of power consumption by the scroll key SK (S45 to S51). When the movement of the scroll key SK is not detected (S44: NO), the step is moved to that in FIG. 10 via "B" shown in FIG. 9. A determination is made for whether or not the depression of a toggle key FK for each of the functions is detected with reference to "B" in FIG. 10 (S52). When the depression of the toggle key FK for each of the functions is detected (S52: YES), the step is changed to selection processing of selection and non-selection by the toggle key FK for each of the functions (S53 to S56). When depression of the toggle key FK for each of the functions is not detected (S52: NO), the step is moved to that shown in FIG. 9 via "A" shown in FIG. 10. The step returns to Step (S43) by "A" in FIG. 9, and key input standby condition continues.

Next, a description will be given for the selection processing of power consumption by a scroll key SK (S45 to S51). When the scroll key SK is moved by a user with reference to the values of power consumption displayed on a power consumption display window PW, selection is made for the power consumption in the power saving mode upon detection of the movement (S45). Then, a determination is made for whether or not the power consumption selected in S45 increases with respect to a total sum of values of the power consumption in the functions to which power is supplied in the power saving mode which is set as an initial value (S46). When power consumption (S46: YES) increases, with reference to point data (D2) on the execution frequency calculated by the automatic selection program of functions to which power is supplied from the execution history of the image processing shown in FIG. 5, functions greater in the execution frequency point are preferentially subjected to selection as a function to which power is supplied in the power saving mode (S47). When power consumption decreases (S46: NO and S48: YES), with reference to the point data (D2) on the execution frequency, functions smaller in the execution frequency point are preferentially subjected to non-selection among the already selected functions as a function to which power is supplied in the power saving mode (S49). As a result of the fact that functions selected by the additional selection of function (S47) and the non-selection of function (S49) have been changed, detection is made for whether or not a total power consumption coincides with the power consumption selected by the scroll key SK (S50). In S50, the total power consumption is determined to coincide with the selected power consumption, when a total power consumption of functions selected by the additional selection of functions (S47) and non-selection of functions (S49) is maximum in a range not exceeding the power consumption selected by the scroll key SK. More specifically, a maximum number of functions are selected by the additional selection of functions (S47) and non-selection of functions (S49) so as not to exceed the power consumption selected by the scroll key SK. When S50 determines that the total power consumption does not coincide with the selected power consumption (S50: NO), the step returns to Step (S46) to continue the processing. In contrast, when S50 determines that the total power consumption coincides with the selected power consumption (S50: YES), the selection is determined to be completed and the selected function is displayed (S51). When the power consumption does not change (S46: NO and S48: NO), the processings in Step (S47), Step (S49) and Step (S50) are skipped and the step is changed to Step (S51).

Figure 11:
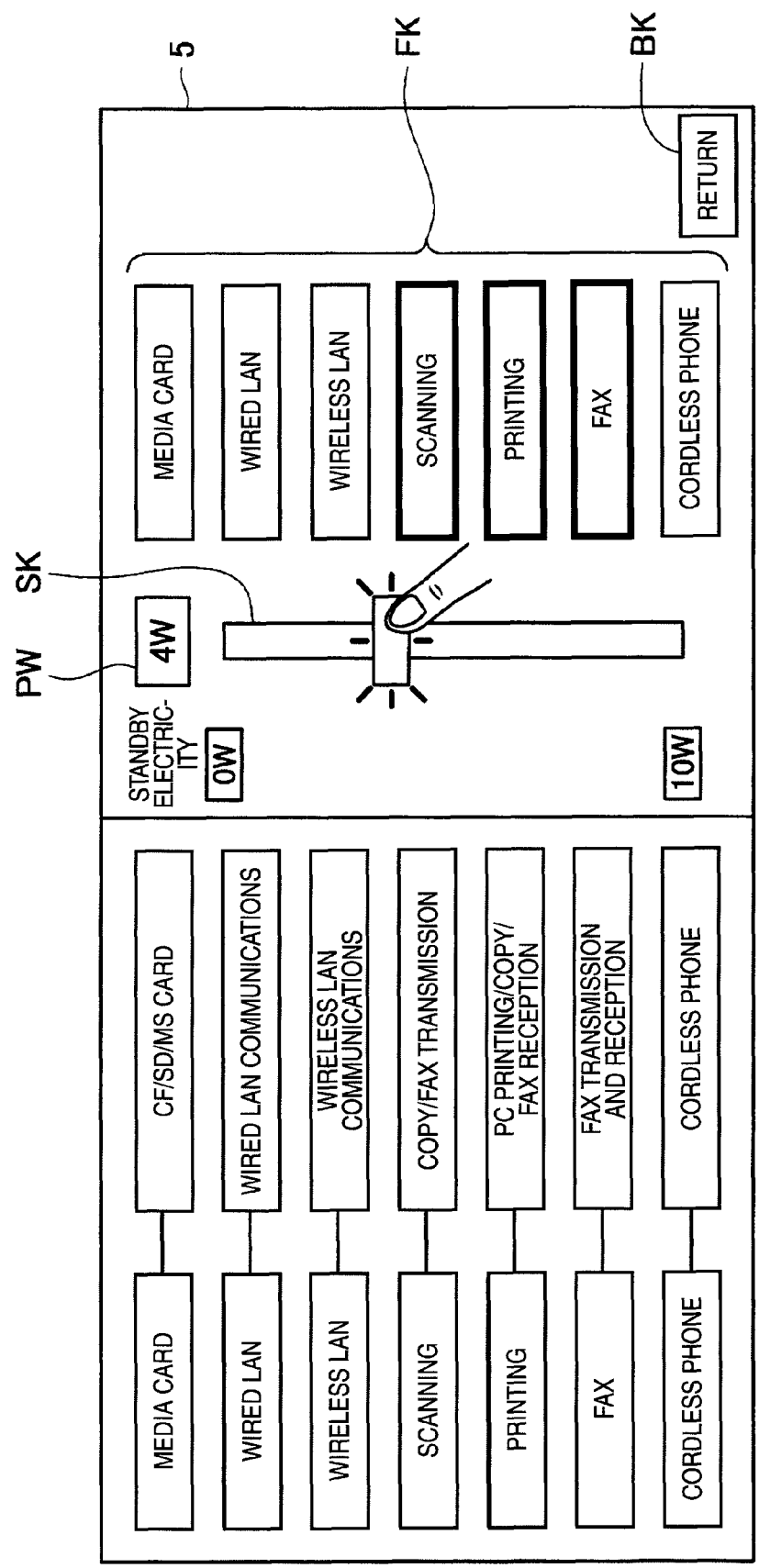
FIG. 11 is a power consumption selection screen for selection processing of power consumption by using a scroll key.

The power consumption selection screen in selection processing of power consumption by the scroll key SK, use amount point, execution frequency point and power consumption are illustrated in FIG. 2, FIG. 6, FIG. 7, FIG. 11 and FIG. 14. On the display screen shown in FIG. 2 where the wired LAN and printing are selected, a user moves the scroll key SK so that a value of power consumption is from 2 W to 4 W while confirming the value on the power consumption display window PW. Then, an increase in the power consumption is determined, thereby either one of FAX and scanning greatest in the execution frequency point among the non-selected functions in FIG. 7 is selected as a function to which power is supplied. When the execution frequency points are equal, for example, selection may be made by giving priority to a function configuring image processing which is the newest in date of operation with reference to the execution history. For example, as shown in FIG. 6, the printing the received FAX is executed previously by one time and newer than the copy which has been executed previously by three times. Therefore, the FAX is selected as a function to which power is supplied. Incidentally, selection when the execution frequency points are equal may also be made by giving priority to a function which does not exceed the power consumption selected by the scroll key SK. For example, since a value of power consumption of FAX shown in FIG. 14 is 1 W, the total power consumption does not exceed a value of power consumption selected by the scroll key SK. Therefore, the FAX is selected as a function to which power is supplied. In this case, display forms such as the display color and size of a closing line are changed depending on a selected condition or a non-selected condition, thereby displaying a function selected on the power consumption selection screen. FIG. 11 illustrates a case where functions in the selected condition are displayed by a bold closing line. Functions such as "scanning," "printing" and "FAX" are in the selected condition. As shown in FIG. 14, the respective values of power consumption in the power saving mode are 2 W, 1 W and 1 W. Therefore, as displayed on the power consumption display window PW, a total value of power consumption in the power saving mode is selected as 4 W.

Next, a description will be given for selection processing (S53 to S56) for selection and non-selection by the toggle key FK for each of the functions with reference to FIG. 10. When a function selected by the toggle key FK for each of the functions is in a selected condition (S53: YES), the selected function is given as a non-selected condition (S54), and when a function selected by the toggle key FK for each of the functions is in the non-selected condition (S53: NO), the selected function is given as a selected condition (S55). In selecting the non-selected condition or the selected condition, the display position of a scroll bar SK and the display content of the power consumption display window PW (S56) are changed.

Figure 12:
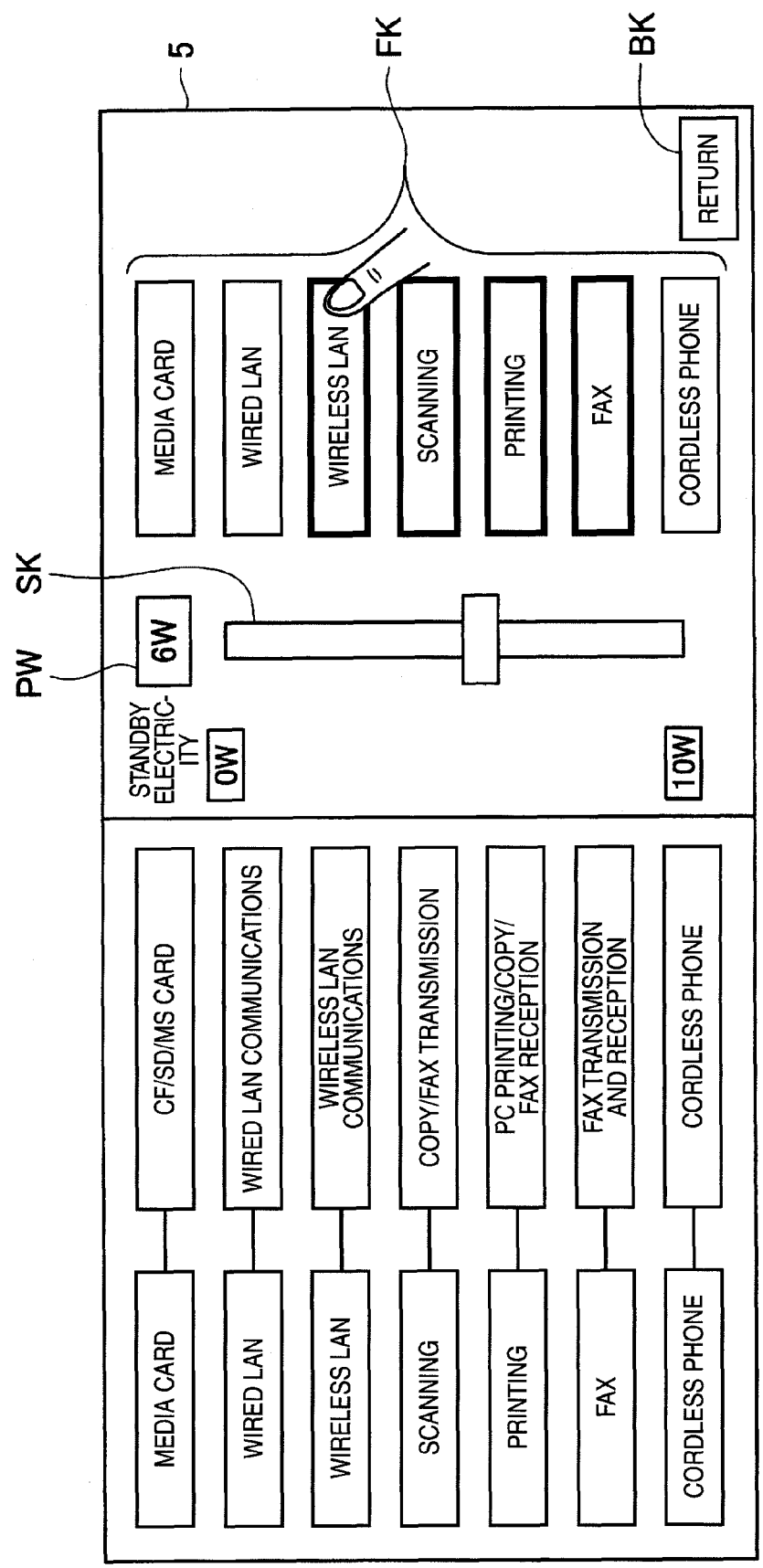
FIG. 12 is a power consumption selection screen (i.e., selection of functions) in the selection processing of selection and non-selection of functions by using a toggle key for each of the functions.
Figure 13:
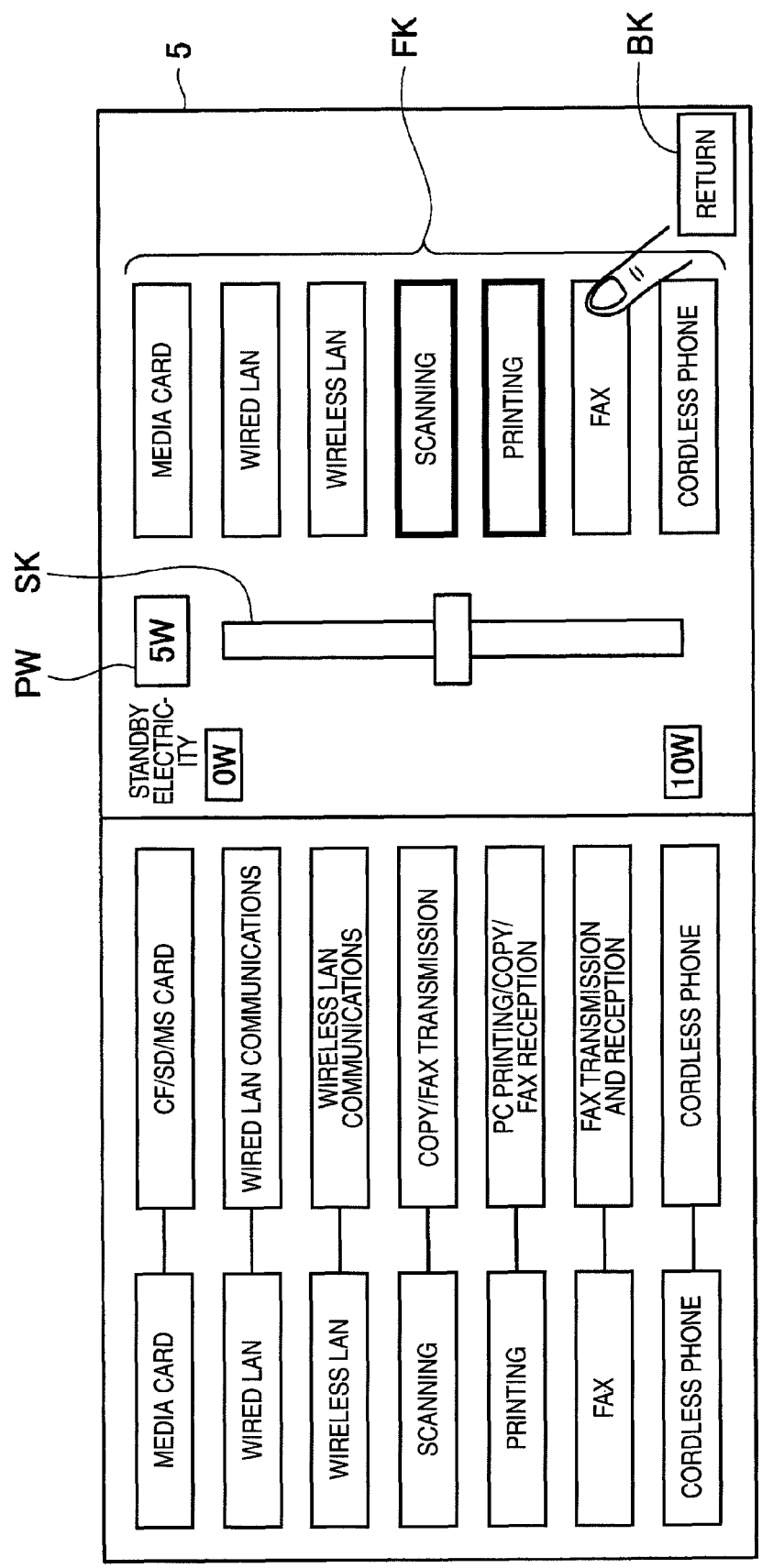
FIG. 13 is a power consumption selection screen (i.e., non-selection of functions) in the selection processing of selection and non-selection of functions by using the toggle key for each of the functions.

FIG. 12 and FIG. 13 illustrate the power consumption selection screens in selection processing for selection and non-selection of functions by the toggle key FK for each of the functions. FIG. 12 shows a case where a user depresses "wireless LAN" from the condition shown in FIG. 11. The "wireless LAN" is switched from the non-selected condition to the selected condition. As shown in FIG. 14, a value of power consumption of the "wireless LAN" in the power saving mode is 2 W. Therefore, as displayed on the power consumption display window PW, a total value of power consumption in the power saving mode is selected as 6 W and the scroll bar SK is also moved to a corresponding position.

FIG. 13 shows a case where a user depresses "FAX" from the conditions shown in FIG. 12. The "FAX" is switched from the selected condition to the non-selected condition. As shown in FIG. 14, a value of power consumption of the "FAX" in the power saving mode is 1 W. Therefore, as displayed on the power consumption display window PW, a total value of power consumption in the power saving mode is selected as 5 W and the scroll bar SK is also moved to a corresponding position.

Information on selection of functions which are subjected to selection or non-selection by the selection processings (S45 to S51 in FIG. 9) of power consumption by the scroll key SK or the selection processings (S53 to S56 in FIG. 10) of selection and non-selection by the toggle key FK for each of the functions is given as data (D1) selected by a user for functions to which power is supplied in the power saving mode and accommodated in the external storage device 22 (S57), and the step returns to Step (S43).

As described above, in the exemplary embodiment, when operations of the scroll key SK and the toggle key FK by a user is detected, selection processings (S45 to S51) of power consumption by the scroll key SK or selection processing (S53 to S56) of selection and non-selection by the toggle key FK of each of the functions are repeated. In this case, when the scroll key SK is detected for movement (S44: YES), function data (D3) on functions to which power is supplied in the power saving mode selected as an initial value in Step (S41) only for the first time is used to perform additional selection of functions (S47) and non-selection of functions (S49). In a second and subsequent loops, data (D1) selected by a user on functions to which power is supplied in the power saving mode is used to perform the additional selection of functions (S47) and the non-selection of functions (S49). This is because the condition selected by the previous additional selection of functions (S47) or non-selection of functions (S49) is accommodated as data (D1) as will be described in Step (S57).

Returning to FIG. 8, a description will be given for Step (S34) and thereafter. In Step (S32), when the key operation indicates that the power consumption selection mode is skipped (S32: NO) or the return key BK of a power consumption selection screen is depressed in Step (S43) (S43: YES), the step is changed to Step (S34). In Step (S34), confirmation is made for whether or not a function to which power is supplied in the power saving mode is selected by a user. More specifically, a determination is made for whether or not a function to which power is supplied in the power saving mode is selected in the power consumption selection mode and the data (D1) selected by a user is accommodated. When a determination is made for the selection made by the user (S34: YES), the data (D1) selected by the user on the functions to which power is supplied in the power saving mode is read (S35). When a determination is made for no selection made by the user (S34: NO), the point data (D2) on the execution frequency has already been accommodated in accordance with an automatic selection program for functions to which power is supplied from the execution history of image processing (FIG. 5). Therefore, the data (D2) on functions to which power is supplied in the power saving mode in which priority is determined according to the execution frequency is taken from point data (D2) on the execution frequency (S36). A function taken in Step (S35) or Step (S36) is set as the functions to which power is supplied in the power saving mode and accommodated in the external storage device 22 as function data (D3) on the functions to which power is supplied in the power saving mode (S37).

Thereafter, a determination is made for whether or not a shift key to the power saving mode is in the ON condition. When the key is determined to be in the ON condition (S38: YES), the condition is changed to the power saving mode (S39). More specifically, processing in which the data (D3) on functions to which power is supplied in the power saving mode, which has been accommodated in S37, is read from the external storage device 22 is performed, thereby restricting the functions to which power is supplied while the image processing apparatus 1 is on standby. When the shift key is determined not to be in the ON condition (S38: NO), the condition will not be changed to the power saving mode but the program is terminated.

Processing in Step (S21) to Step (S23) in the automatic selection programs (FIG. 5) for functions to which power is supplied from the execution history of image processing is performed on the basis of instructions from the CPU 21, and means for storing the calculated use amount point in the external storage device 22 corresponds to the execution frequency calculation unit. Further, means for performing the processings of Step (S24) to Step (S26) on the basis of instructions from the CPU 21 and distinguishing use amount points in the external storage device 22 or the RAM 23 to select a function corresponds to the first selection unit. Means for executing the processings of Step (S34) to Step (S37) in the program (FIG. 8) for processing in the power consumption selection mode and shifting to power saving mode on the basis of instructions from the CPU 21 and storing in the external storage device 22 functions selected by a user via a liquid crystal display part 42 and a matrix switch 41 after the functions are processed by the CPU 21 through the display control part 28 and the touch detection part 29 corresponds to the function setting unit.

Total points shown in FIG. 7 correspond to numerical values of loads accumulated for image processing in which the loads expressed in terms of numerical values have been executed.

Further, means for executing the processing in Step (S33) in the program (FIG. 8) for processing in the power consumption selection mode and shifting to power saving mode, that is, processing in programs for the power consumption selection mode (FIG. 9 and FIG. 10) on the basis of instructions from the CPU 21, displaying the programs on the liquid crystal display part 42 and storing the programs in the external storage device 22 corresponds to the second selection unit.

Further, means for executing processing in Step (S41) in programs for the power consumption selection mode (FIG. 9 and FIG. 10) on the basis of instructions from the CPU 21 and reading corresponding functions into the RAM 23 from the external storage device 22 corresponds to the initial setting unit. Means for executing processing in Step (S45) on the basis of instructions from the CPU 21 and accepting the power consumption input by a user using a matrix switch 41 corresponds to the power selection unit. Means for executing processings in Step (S46) to Step (S50) on the basis of instructions from the CPU 21 corresponds to the priority selection unit.

Means for executing processings in Step (S52) to Step (S55) in programs for the power consumption selection mode (FIG. 9 and FIG. 10) on the basis of instructions from the CPU 21, which is subjected to processing by the CPU 21 in response to input by a user by use of the matrix switch 41, corresponds to the individual selection unit.

Still further, display of Step (S51) and Step (S56) in programs for the power consumption selection mode (FIG. 9 and FIG. 10) and the liquid crystal display part 42 on which the display is performed correspond to the input display unit. The matrix switch 41 corresponds to a touch panel.

In addition, the "media card," "wired LAN," "wireless LAN," "scanning," "printing," "FAX" and "cordless phone" shown in FIG. 2, FIG. 7 and FIG. 11 to FIG. 14 correspond to functions. The "printing received FAX," "printing by wired LAN," copy, and "liquid crystal display of image data of media cards" shown in FIG. 6 correspond to image processing. The operation time shown in FIG. 6 corresponds to a processing time, while the number of sheets of paper which have been printed and number of sheets of paper which have been scanned correspond to a processing amount.

As explained above, according to the exemplary embodiment of the invention, the automatic selection program (FIG. 5) on functions to which power is supplied from the execution history of image processing is used to calculate the execution frequency for each of the functions configuring image processing based on the execution history of image processing and accommodated in the external storage device 22 as point data of execution frequency for each of the functions and as data (D2) on functions to which power is supplied in the power saving mode. Thereby, it is possible to set the functions to which power is supplied in the power saving mode on the basis of the execution frequency.

A user is not required to select and set functions to which power is supplied in the power saving mode, eliminating a necessity for complicated operations of selecting the functions to which power is supplied in the power saving mode, which is more convenient for users.

As a function in agreement with the condition of use of the image processing apparatus 1, power can be supplied in the power saving mode. Functions high in the execution frequency can be executed quickly and smoothly from the power saving mode. Therefore, the condition of electricity use can be optimized flexibly and simply depending on the condition of use, without impairing the convenience of the image processing apparatus 1.

Further, the executed image processing is expressed in terms of numerical values for loads and accumulated as a use amount point according to the content thereof. Then, the image processing is accommodated in the external storage device 22 as point data (D2) on execution frequency for each of the functions. Since the execution frequency is expressed in terms of numerical values and calculated for each of the functions, it is possible to select functions to which power is supplied in the power saving mode more conveniently through comparison of the values.

In this case, by accumulating the execution history multiple times, it is possible to accommodate points which fully reflect the execution history in the past. Further, the execution history is accumulated in a predetermined number of times, by which it is possible to adjust the length of execution history, the execution frequency of which should be grasped.

Further, functions to be used are different, depending on types of image processing. On the basis of indexes of processing amount such as operating time (processing time), the number of sheets of paper which have been printed and number of sheets of paper which have been scanned, use amount points of the image processing can be accurately expressed in terms of coefficients, and loads for each of the functions configuring the image processing can also be accurately expressed in terms of numerical values.

Further, the programs for the power consumption selection mode (FIG. 9 and FIG. 10) can be used to give priority to setting functions to which power is supplied in the power saving mode selected according to the user's instructions. Still further, according to Step (S34) to Step (S37) in the power consumption selection mode and the shifting program (FIG. 8) to the power saving mode, instructions from a user are given priority, and if no instructions from the user are given, it is possible to set functions which power is supplied in the power saving mode selected on the basis of the execution frequency for each of the functions introduced by the execution history for image processing. Since the functions are set on the basis of the execution frequency if no instructions are given from the user while giving priority to the user's selection, it is possible to select a power saving mode convenient for users.

Further, according to Step (S41) in the programs for the power consumption selection mode (FIG. 9 and FIG. 10), the function set by the data (D3) on functions to which power is supplied in the power saving mode is given as an initial setting function. Therefore, when instructions are given from a user, priority is given to the user's instructions, and when no instructions are given from the user, the function set by the data (D3) is selected. In this case, the function by the user's instructions is also set by the data (D3). Therefore, if there is no function set by the previous user's instructions or the user' instructions, functions selected on the basis of the execution frequency can be reliably reflected.

Still further, on the basis of the power consumption selected by the power selection unit according to the user's instructions, the priority selection unit automatically selects functions to which power is supplied according to the execution frequency. Therefore, it is possible to optimize the condition of electricity use flexibly and simply depending on the condition of use within a range of the power consumption desired by the user.

Further, the function selected by the function data (D3) which has already been accommodated is given as an initial setting condition and the programs for the power consumption selection mode (FIG. 9 and FIG. 10) are used to select functions to which power is supplied in the power saving mode selected by the user's instructions on the basis of the execution frequency for each of the functions. In this case, as the function data (D3), of the selection by the user's instructions and the selection based on the execution frequency, priority is given to the selection by the user's instructions. It is possible to select the functions to which power is supplied in the power saving mode according to the execution frequency for each load, with priority given to the user's instructions. Therefore, functions that meet the user's intention and condition of use can be selected.

Further, according to Step (S46) to Step (S50) in the programs for the power consumption selection mode (FIG. 9 and FIG. 10), when processing still continues after selection or non-selection of functions is made, new functions can be subjected to additional selection or additional non-selection on the basis of the data (D1) selected by a user for the functions to which power is supplied in the power saving mode which have already been selected. It is not required to reset the functions which have already been selected and to newly select functions from the beginning every time of change in the selection of power consumption by the scroll key SK. However, already selected information can be effectively utilized.

Still further, according to Step (S52) to Step (S55) in the programs for the power consumption selection mode (FIG. 9 and FIG. 10), a user is able to make selection or non-selection individually for each of the functions.

In addition, since Step (S51) and Step (S56) in the programs for the power consumption selection mode (FIG. 9 and FIG. 10) are displayed on a liquid crystal display part 42, it is possible to visually recognize the input of the user's instructions and a selected condition of the function. The liquid crystal display device 42 includes a matrix switch 41, thereby input can be done by using the matrix switch 41 as a touch panel, while confirming the liquid crystal display.

The invention shall not be limited to the above-described exemplary embodiments. The invention may be improved or modified in various ways within a scope of the invention.

For example, in the above-described exemplary embodiment, the image processing which can be executed by the image processing apparatus 1 shall not be limited to that described in FIG. 6. Individual functions described in FIG. 2 and others may be combined to provide other types of image processing. Further, the functions configuring the image processing shall not be limited to those described in FIG. 2 or others. It is possible to define other functions such as arithmetic processing of image data.

Still further, the execution history is given as a case that image processing performed five times in the past is accumulated. However, as a matter of course, the number of accumulations may be changed appropriately.

What is claimed is:

1. An image processing apparatus comprising:
an execution frequency calculation unit that calculates an execution frequency for each of a plurality of functions of the image processing apparatus to perform image processing on the basis of an execution history of the image processing;
a first selection unit that selects a function to which power is supplied in a power saving mode from the plurality of functions based on the execution frequency of each of the plurality of functions of the image processing apparatus calculated by the execution frequency calculation unit; and
a function setting unit that sets the function selected by the first selection unit as a function to which power is supplied in the power saving mode.

2. The image processing apparatus according to claim 1, wherein the execution frequency calculation unit expresses a load for each of the plurality of functions in accordance with an execution of the image processing in terms of numerical values and accumulates the numerical values of the load for the image processing that has already been performed multiple times.

3. The image processing apparatus according to claim 1, wherein the execution frequency calculation unit expresses a load for each of the plurality of functions in terms of numerical values according to at least one of type, processing time and processing amount of the image processing.

4. The image processing apparatus according to claim 1, wherein the first selection unit selects a particular function as the function to which power is supplied in the power saving mode when an execution frequency of the particular function calculated by the execution frequency calculation unit reaches a criteria value.

5. The image processing apparatus according to claim 2, wherein the execution frequency calculation unit accumulates the numerical values of the load for the image processing which has already been executed in a predetermined number of times.

6. An image processing apparatus comprising:
an execution frequency calculation unit that calculates an execution frequency for each of a plurality of functions to perform image processing on the basis of an execution history of the image processing;
a first selection unit that selects a function to which power is supplied in a power saving mode from the plurality of functions based on the execution frequency calculated by the execution frequency calculation unit;
a function setting unit that sets the function selected by the first selection unit as a function to which power is supplied in the power saving mode; and
a second selection unit that selects the function to which power is supplied in the power saving mode according to an input,
wherein, when the function to which power is supplied in the power saving mode is not selected by the second selected unit, the function setting unit sets the function to which power is supplied in the power saving mode as the function selected by the first selection unit, and
wherein, when the function to which power is supplied in the power saving mode is selected by the second selection unit, the function setting unit sets the function to which power is supplied in the power saving mode as the function selected by the second selection unit.

7. The image processing apparatus according to claim 6, wherein the second selection unit comprises:
an initial setting unit that sets a function set by the function setting unit as an initial setting function;
a power selection unit that selects a power consumption in the power saving mode according to the input; and
a priority selection unit that selects or non-selects the function to which power is supplied in the power saving mode with priority based on the execution frequency calculated by the execution frequency calculation unit in accordance with a power difference between the power consumption selected by the power selection unit and the power consumption supplied to the initial setting function,
wherein the priority selection unit selects the function to which power is supplied in the power saving mode with priority given to a function having high execution frequency, and
wherein the priority selection unit non-selects the function to which power is supplied in the power saving mode with priority given to a function having low execution frequency.

8. The image processing apparatus according to claim 6, wherein the second selection unit comprises an individual selection unit that selects or non-selects individually for each of the plurality of functions.

9. The image processing apparatus according to claim 6, further comprising:
an input display unit that receives the input and displays a selected condition of each of the plurality of functions.

10. The image processing apparatus according to claim 7, wherein the priority selection unit selects the function to which power is supplied in the power saving mode with priority given to the function having high execution frequency when the power consumption selected by the power selection unit is greater than the power consumption due to power supply to the initial setting function, and
wherein the priority selection unit non-selects the function to which power is supplied in the power saving mode with priority given to function having low execution frequency when the power consumption selected by the power selection unit is smaller than the power consumption due to the power supply to the initial setting function.

11. The image processing apparatus according to claim 7 wherein, when the priority selection unit is continuously executed after the priority selection unit selects or non-selects the function to which power is supplied in the power saving mode,
the priority selection unit selects the function to which power is supplied in the power saving mode with priority given to the function having high execution frequency among the functions that are not selected, when the power consumption selected by the power selection unit is greater than the power consumption of the function selected by previous execution of the priority selection unit, and
the priority selection unit non-selects the function to which power is supplied in the power saving mode with priority given to the function having low execution frequency among the already selected functions, when the power consumption selected by the power selection unit is smaller than the power consumption of the function selected by the previous execution of the priority selection unit.

12. The image processing apparatus according to claim 9, wherein the input display unit comprises a touch panel.

13. A non-transitory, computer-readable medium having a computer program stored thereon and readable by an image processing apparatus comprising a plurality of functions to perform image processing, the computer program, when executed by the image processing apparatus, causes the image processing apparatus to perform operations comprising:

calculating an execution frequency for each of the plurality of functions of the image forming apparatus on the basis of an execution history of the image processing;

selecting a function to which power is supplied in a power saving mode from the plurality of functions based on the calculated execution frequency of each of the plurality of functions of the image processing apparatus; and setting the selected function as a function to which power is supplied in the power saving mode.

14. The non-transitory computer-readable medium according to claim 13, wherein the computer program causes the image processing apparatus to perform operations further comprising:

selecting a particular function as the function to which power is supplied in the power saving mode when a calculated execution frequency of the particular function reaches a criteria value.

* * * * *